– – – – –
United States Patent [19]

Suzui et al.

[11] 3,963,661

[45] June 15, 1976

[54] DIALLYL PHTHALATE RESIN-CONTAINING AQUEOUS EMULSIONS WITH THERMOSETTING VINYL EMULSIONS

[75] Inventors: Akio Suzui, Amagasaki; Shinji Nose, Kobe; Takashi Kodama, Matsuyama; Kenji Yokoyama, Amagasaki; Kazuya Matsumoto, Kobe; Yoshiharu Fujio, Amagasaki, all of Japan

[73] Assignee: Osaka Soda Co., Ltd., Osaka, Japan

[22] Filed: July 16, 1974

[21] Appl. No.: 488,926

[30] Foreign Application Priority Data
May 31, 1974 Japan................................. 49-62406

[52] U.S. Cl.................... 260/29.4 UA; 260/29.7 W; 260/836; 260/851; 260/856; 260/876 R; 428/151; 526/266; 526/320; 526/326; 526/329

[51] Int. Cl.$^2$.................. C08L 31/08; C08L 35/02; C08L 35/04

[58] Field of Search.............. 260/29.7 W, 78.4 UA, 260/29.4 UA

[56] References Cited
UNITED STATES PATENTS

| | | | |
|---|---|---|---|
| 3,079,356 | 2/1963 | Oda et al. | 260/29.7 W |
| 3,131,088 | 4/1964 | Festag | 260/29.7 W |

*Primary Examiner*—Murray Tillman
*Assistant Examiner*—A. H. Koeckert
*Attorney, Agent, or Firm*—Sherman & Shalloway

[57] ABSTRACT

A diallyl phthalate resin-containing aqueous emulsion containing an aqueous emulsion of a diallyl phthalate resin of a rate of polymerization of 30 – 75 weight % consisting of 50 – 100 weight % of diallyl phthalate and 50 – 0 weight % of an alkyl acrylate, and an aqueous emulsion of a thermosetting vinyl resin consisting of 10 – 1 weight % of a vinyl compound containing a thermosetting functional group and 90 – 99 weight % of a vinyl compound not containing a thermosetting functional group, the content of said diallyl phthalate resin component to said thermosetting vinyl resin component being in a proportion of 10 – 70 weight % of the former to 90 – 30 weight % of the latter.

3 Claims, No Drawings

DIALLYL PHTHALATE RESIN-CONTAINING AQUEOUS EMULSIONS WITH THERMOSETTING VINYL EMULSIONS

This invention relates to aqueous diallyl phthalate resin emulsions of a high rate of polymerization to which are imparted excellent film-forming properties, and in which film formed therefrom excells in such properties as luster, thermal resistance and adhesiveness.

More particularly, this invention relates to an emulsion composed of an aqueous diallyl phthalate resin emulsion (having a rate of polymerization of 30 – 75 weight %) and consisting of 50 – 100 weight % of diallyl phthalate and 50 – 0 weight % of an alkyl acrylate, and an aqueous thermosetting vinyl resin emulsion consisting of 10 – 1 weight % of a vinyl compound containing a thermosetting functional group and 90 – 99 weight % of a vinyl compound not containing a thermosetting functional group, wherein the content of said diallyl phthalate resin portion is in the range of 10 – 70 weight % while that of said thermosetting vinyl resin portion is in the range of 90 – 30 weight %. As used herein, the term "rate of polymerization" means the degree of conversion of monomer to polymer.

The process for preparing an aqueous diallyl phthalate resin emulsion by the aqueous emulsion polymerization method is known from British Patent No. 821,093. This patent specification, however, contains no mention at all of the application of the resulting aqueous emulsion. In Japanese LaidOpen Application No. 90378/73 there is disclosed that a decorative sheet can be fomed by adding a water-soluble radical initiator to an aqueous diallyl phthalate resin emulsion of 30 – 90 mol % of diallyl phthalate and 10 – 70 mol % of an acrylic ester, impregnating a decorative paper with this emulsion, drying the impregnated decorative paper, superposing the decorative paper on a plywood and thereafter hot-pressing the assembly. There is also disclosed in this application that by incorporating a styrene-butadiene latex or vinyl chloride resin in the foregoing emulsion it is possible after application and drying of the emulsion to form a coating by heat-curing the coated emulsion without the application of pressure.

However, in the case of the above diallyl phthalate resin-containing aqueous emulsion, there is a tendency for a decline in such desirable properties as thermal resistance, dimensional stability, electric insulation and chemical resistance, that are possessed by the diallyl phthalate resins. Hence, it was found that there was a limitation to the use to which this emulsion could be put.

As a consequence of research with a view to finding a solution to the foregoing limitation it was found that a diallyl phthalate resin-containing aqueous emulsion composed of the aforesaid aqueous diallyl phthalate resin emulsion and aqueous thermosetting vinyl resin emulsion, both present in the specified range, could not only impart to said diallyl phthalate resin-containing aqueous emulsion excellent film-forming properties, but also could provide a composition in which the occurrence of the foregoing declining desirable properties has been checked. Further, it was found that when the emulsion was impregnated into a substrate and hot-pressed a still greater improvement could also be achieved in this case.

It is therefore an object of the present invention to provide a diallyl phthalate resin-containing aqueous emulsion capable of forming a coating having excellent and improved properties, by heating emulsion-impregnated material without the application of pressure.

Another object of the invention is to provide a diallyl phthalate resin-containing aqueous emulsion capable of impregnating a substrate and then hot-press mold a substrate so impregnated, to produce a shaped article having excellent and improved properties.

Other objects and advantages of the present invention will become apparent from the following description.

The aqueous diallyl phthalate (DAP) resin emulsion used in the present invention can be prepared by emulsion polymerization of an aqueous emulsion system containing 50 – 100 weight % of diallyl phthalate, 50 – 0 weight % of an alkyl acrylate and a suitable amount, say, about 1 – 10 weight %, based on the polymerization components, of an emulsifier. The method of preparing this aqueous DAP resin emulsion is per se well known. Hence, for avoiding verboseness, it will only be briefly described below. The polymerization reaction is carried out in the presence of a polymerization catalyst. The amount used of the catalyst can be suitably chosen; for example, in the order of 0.1 – 5.0 weight % of the polymerization components. The amount of water used in forming the aqueous emulsion system can also be suitably chosen; for example, in the order of 100 – 200 weight % of the polymerization components. While the reaction proceeds even at room temperature, it is preferably carried out with the addition of heat. For instance, a temperature in the range of about 40 – 100°C., and preferably about 60° – 95°C. can be employed. While the reaction is usually carried out under normal atmospheric pressure conditions, it also can be carried out under increasing pressure conditions, if desired.

Emulsifiers for forming the aqueous emulsion system include anionic surfactants selected from the salts of alkylarylsulfonic acids and alkylsulfosuccinic acids such as the ammonium, Na and K salts of alkylnaphthalenesulfonic acids, the ammonium, Na and K salts of alkylbenzenesulfonic acids, and the ammonium, Na and K salts of alkylsulfosuccinic acids; nonionic surfactants selected from the group consisting of the polyoxyethylenealkyl ethers, polyoxyethylenealkylphenyl ethers and polyoxypropylenepolyoxyethylene ethers; and nonionic anionic surfactants such as the ammonium, Na and K salts of the sulfuric esters or phosphoric esters of the foregoing nonionic surfactants.

Useful polymerization catalyst include persulfates, such as ammonium persulfate, potassium persulfate and sodium persulfate.

Useful diallyl phthalates (DAP), include the diallyl esters of phthalic, isophthalic and terephthalic acids. Useful alkyl acrylates include the $C_1 - C_8$ alkyl esters, (e.g., the methyl, ethyl, n- or isopropyl, n-, iso-, sec- and tertbutyl, 2-ethylhexyl and octyl esters), of acrylic acid.

Of the aqueous DAP resin emulsions obtained as hereinabove described, that of a rate of polymerization of 30 – 75 weight % is used in the present invention. The rate of polymerization is determined in the following manner.

Method of determining the rate of polymerization
(degree of conversion of monomer to polymer)

Five grams of the sample polymerization product emulsion is weighed out and, after adding thereto 100 milliliters of methanol and shaking well, a few drops of a 5% alum solution is added followed by shaking well to cause flocculation of the particles, which are then settled with a centrifuge. The supernatant liquid is then removed by decantation, following which the precipitate is dried in a dryer at 110 ± 3°C until the weight becomes constant. The dried mass is then weighed (A grams), and the rate of polymerization is calculated as follows:

$$\text{Rate of polymerization (wt. \%)} = \frac{A \text{ grams}}{B \text{ grams}} \times 100$$

where B represents the weight of polymerization components contained in 5 grams of the aqueous emulsion prior to initiation of the polymerization reaction.

The aqueous DAP resin emulsion of this invention can be obtained by terminating the polymerization reaction by cooling and/or adding a polymerization inhibitor such as hydroquinone. In the present invention, as hereinbefore indicated, an aqueous DAP resin emulsion of a high rate of polymerization, i.e., at least 30 weight %, and preferably at least 35 weight %, is used. In the case of an aqueous DAP resin emulsion of such a high rate of polymerization there is formed a mixture system consisting of the DAP monomer, the prepolymer dissolved in the DAP monomer and a gelled polymer that has been swelled by the DAP monomer. The film-forming property of this mixture system is extremely poor, differing from the case of the aqueous DAP resin emulsion of a low rate of polymerization that it formed by a mixture system consisting of the DAP monomer and the prepolymer dissolved in the DAP monomer, with the consequence that unless it is submitted to a hot-press molding treatment a usable film-forming property is not demonstrated.

The aqueous DAP resin emulsion used in the present invention is a mixture system containing a gelled polymer that has been swelled by the DAP monomer. When the rate of polymerization is a too low (a value of less than 30 weight %), excellent thermally resistant compositions cannot be provided. On the other hand, when this value is too high (such that it exceeds 75 weight %), difficulty is experienced in imparting the film-forming property.

In this invention the rate of polymerization of the foregoing DAP resin emulsion can be suitably chosen in accordance with the proportion in which the diallyl phthalate and alkyl acrylate are used. When the amount used of diallyl phthalate is relatively great, a rate of polymerization of about 30 – 60 weight % is preferably used, while when the amount of alkyl acrylate is increased, a rate of polymerization of about 40 – 75 weight % is preferably chosen. For instance, when the content of the alkylacrylate is 50 weight % and that of diallyl phthalate is 50 weight %, a rate of polymerization of about 42 – 73 weight % is preferred.

The DAP resin-containing aqueous emulsion of this invention also contains a thermosetting vinyl copolymer resin aqueous emulsion consisting of 10 – 1 weight % of a vinyl compound containing a thermosetting functional group and 90 – 99 weight % of a vinyl compound not containing such a functional group. This thermosetting vinyl resin is obtained by the emulsion copolymerization of the foregoing two types of vinyl compounds (monomers) in an aqueous medium. The method of preparing this thermosetting vinyl resin is per se well known. Hence, for avoiding verbosity, the method will only be briefly described below. The polymerization reaction is carried out in the presence of a polymerization catalyst. The polymerization catalyst can be used in an amount of about 0.05 – 1.0 weight %. The amount of water used in forming the aqueous emulsion system can be used in an amount of about 65 – 200 weight %. The reaction is preferably carried out by the addition of heat at a temperature of about 30° – 100°C., and preferably about 60° – 90°C. The emulsifiers used for forming this aqueous emulsion system are the same emulsifiers as those illustrated previously in connection with the preparation of the aqueous DAP resin emulsion.

Useful polymerization catalysts include, for example, hydrogen peroxide and the persulfates such as ammonium persulfate, sodium persulfate and potassium persulfate.

The aforementioned thermosetting vinyl copolymer resin used in the present invention is derived from (A) 90 – 99 weight % of a vinyl compound not containing a thermosetting functional group and (B) 10 – 1 weight % of a vinyl compound containing a thermosetting functional group. When a copolymer in which the amount of the foregoing vinyl compound (B) is contained in excess of 10 weight % is used, the coating obtained from the resulting DAP resin-containing aqueous emulsion becomes too hard and loses the suitable softness that is desired. On the other hand, when a copolymer in which the amount of the vinyl compound (B) is less than 1.0 weight % is used, an adequate improvement cannot be hoped for in such properties as the thermal resistance, chemical resistance and water resistance of the coating formed from the invention DAP resin-containing aqueous emulsion.

Examples of the foregoing vinyl compounds (A) not containing a thermosetting functional group, include the $C_1 - C_8$ alkyl esters of alpha, beta-unsaturated carboxylic acids, such as the methyl, ethyl, butyl, 2-ethylhexyl and octyl esters of acrylic and methacrylic acids; vinyl esters such as vinyl acetate, vinyl propionate and vinyl versatate (VEOVA: trademark of Shell Chemical Company); aromatic vinyl compounds such as styrene and vinyltoluene; and alpha, beta-unsaturated nitriles such as acrylonitrile and methacrylonitrile.

Examples of the vinyl compounds (B) containing a thermosetting functional group include vinyl compounds containing a glycidyl group such as glycidyl acrylate, glycidyl methacrylate and allylglycidyl ether; vinyl compounds containing either an N-methylol or N-alkoxymethyl group such as N-methylolacrylamide, N-methylolmethacrylamide, N-methoxymethylacrylamide and N-butoxymethylacrylamide; vinyl compounds containing a carboxyl group such as acrylic acid, methacrylic acid, crotonic acid, itaconic acid, maleic acid, fumaric acid, itaconic acid semiester and maleic acid semiester; vinyl compounds containing a hydroxyl group such as 2-hydroxyethyl acrylate and 2-hydroxyethyl methacrylate; vinyl compounds containing an amino group such as vinylpyridine; and vinyl compounds containing an amido group such as acrylamide, methacrylamide and maleinamide.

Of the thermosetting vinyl resins, those containing glycidyl, N-methylol or N-alkoxymethyl groups do not require a cross-linking agent and are of the type that self-cross-link by the functional groups that they themselves possess. On the other hand, the resins containing carboxyl, hydroxyl, amino or amido groups are of the type that cross-link by the presence of a cross-linking agent such as a melamine resin, urea resin or epoxy resin.

The reaction of the foregoing two types of thermosetting vinyl resins is accelerated by an acid catalyst. Hence, the use of a curing catalyst such as paratoluenesulfonic acid or ammonium chloride is to be preferred.

The aqueous emulsion compositions of this invention contain both the aqueous DAP resin emulsion and the aqueous thermosetting vinyl resin emulsion. These two emulsions are contained in such a proportion that the DAP resin portion is present in an amount of from 10 – 70 weight %, while the thermosetting vinyl resin portion is present in an amount of from 90 – 30 weight %. By the DAP resin portion is meant the amount of diallyl phthalate or diallyl phthalate and alkyl acrylate used in forming the aqueous DAP resin emulsion, and by the thermosetting vinyl resin portion is meant the resinous solids content.

If the resinous components are not blended as in the subject invention, but instead an emulsion is prepared by aqueous emulsion copolymerization, using the same components as those used for forming the two resinous components and with the same proportions resulting, the film-forming property of this emulsion is very poor. Additionally, the coating formed from this emulsion becomes too hard, and the suitable softness that is desired of the film is lost. Further, when the DAP resin content in the invention emulsion is less than 10 weight %, an adequate improvement in such properties as thermal resistance, chemical resistance and water resistance of the coating formed from such an emulsion cannot be expected. On the other hand, when the DAP resin content is in excess of 70 weight %, not only the ability to form a coating becomes poor, but also the coating formed is too hard, and he desired suitable softness is lost.

The invention DAP resin-containing aqueous emulsion can contain, as required, in addition to the DAP resin component and the thermosetting vinyl resin component, a cross-linking agent for said thermosetting vinyl resin. While the amount in which this cross-linking agent is added can be suitably chosen in accordance with the class and amount used of the thermosetting vinyl resin, usually an amount in the range of about 10 – 100 parts by weight, and preferably 20 – 70 parts by weight, per 100 parts by weight of the thermosetting resin is used. Specific examples of such a cross-linking agent include melamine-formaldehyde resins such as methylolated melamine, methylated methylolmelamine and butylated methylolmelamine; guanamine-formaldehyde resins such as methylolated benzoguanamine and butylated methylol benzoguanamine; urea-formaldehyde resins such as methylolated urea, methylated methylolurea and butylated methylolurea; epoxy resins such as the bisphenol A-epichlorohydrin type, novolakepichlorohydrin type, glycerol triglycidyl ether type, epoxidized polyolefins, epoxidized soybean oil, cyclohexene oxide and glycidyl phthalate; and metal oxides such as CaO, ZnO and $ZrO_2$.

Further, since the DAP resin contained in the DAP resin-containing aqueous emulsion of this invention contains an allyl group, a radical initiator can be incorporated in the invention emulsion for accelerating the cure of the resin. Specific examples of such a radical initiator include organic peroxides such as benzoyl peroxide, t-butylperoxybenzoate and t-butylperoxypivalate. At this time, it is also possible, if desired, to make a further addition of an unsaturated polyester resin as a curing agent for DAP. The use of the radical initiator in an amount of about 1 – 10 weight %, and preferably about 2 – 6 weight %, based on the DAP resin content will suffice. The unsaturated polyester resin is used in an amount on the order of 10 – 100 parts by weight, and preferably 20 – 70 parts by weight, per 100 parts by weight of the DAP resin content.

The DAP resin-containing aqueous emulsion of the present invention is stabilized simply by mixing the aqueous diallyl phthalate resin emulsion and the aqueous thermosetting vinyl resin emulsion in the amounts previously indicated. If desired, an emulsion stabilizer can be added.

Emulsion stabilizers include, for example, nonionic surfactants such as polyoxyethylenealkyl ethers and polyoxyethylenealkylphenyl ethers; and water-soluble high molecular weight protective colloids such as polyvinyl alcohol, hydroxyethylcellulose, methylcellulose, sodium polyacrylate, polyacrylamide, casein and water-soluble starch. It will suffice to use these emulsion stabilizers in an amount in the order of 0.1 – 5 weight % based on the DAP resin-containing aqueous emulsion.

Further, if desired, the invention emulsion can contain such other additives as inorganic pigments, e.g., titanium dioxide, lithopone, carbon black, iron black, red oxide, ochre, chromium oxide, ultramarine and aluminum powder; colorants, e.g., Permanent Red, Hansa Yellow, Phthalocyanine Green and Phthalocyanine Blue; pigment dispersants, e.g., formaldehyde condensates of sodium alkylnaphthalenesulfonates, low molecular weight ammonium polyacrylates and low molecular weight styrene-ammonium maleate copolymers; wetting agents, e.g., polyoxyethylene fatty acid esters, polyoxyethylenealkylphenyl ethers, sulfosuccinic acid derivatives and polyoxypropylene-polyoxyethylene ether; defoaming agents, e.g., n-octyl alcohol, tributyl phosphate, pine oil and silicone defoaming agents; thickeners, e.g., polyvinyl alcohol, methylcellulose and hydroxyethylcellulose; film-forming assistants, e.g., alkyl ethers of diethylene glycol and their derivatives, including acetates, ethylene glycol monobutyl ether, and ethylene glycol monobutyl ether acetate; antifungal agents, e.g., mercury compounds, tin compounds, copper compounds, phenol compounds, sulfur compounds and invert soaps; and fillers, e.g., calcium carbonate, clay, talc, barite and mica. These additives can be used up to such amounts as do not impair the stability of the invention DAP resin-containing aqueous emulsion. In using these additives, those which are hydrophilic are preferably first dissolved in water, whereas those which are oleophilic are preferably first emulsified.

The DAP resin-containing aqueous emulsion of the present invention can be used for such purposes as coating or impregnating various substrates as paper, textile materials, knit and woven fabrics, nonwoven fabrics, wood, sheet metals and other materials, followed by curing the coated of impregnated substrate by heating or by hot-pressing. It can also be converted to an additive resin powder by precipitation and thus be used as a molding material.

The following examples along with control experiments are given for more fully illustrating several modes of the DAP resin-containing aqueous emulsion of the present invention.

I. Illustrations of the preparation of the aqueous DAP resin emulsion

The monomer, emulsifier and water, as indicated in the following Table 1, were charged to a flask and, after purging the interior of the flask with nitrogen, the charged system was stirred and emulsified, after which the temperature of the system was raised up to 70° to 80°C. This was followed by adding to this system the polymerization catalyst indicated in the following Table 1, after which the polymerization reaction was carried out at a polymerization temperature of 70° or 80° ± 2°C. for the period of time indicated in said table. Thus was obtained an aqueous DAP resin emulsion of a rate of polymerization as indicated in said table.

Table 2

| Preparation Illustration | | Rate of Polymerization | | | |
|---|---|---|---|---|---|
| | | 1 | 2 | 3 | 4 |
| Hour at Which Samples Were Collected | 0.25 hr | — | — | 23 | 28 |
| | 0.5 hr | — | 23 | 32 | 38 |
| | 1.0 hr | 17 | 35 | 43 | 48 |
| | 1.5 hr | 25 | 43 | 50 | 55 |
| | 2 hr | 31 | 50 | 55 | 61 |
| | 3 hr | 40 | 60 | 63 | 71 |
| | 4 hr | 47 | 69 | 69 | 77 |
| | 5 hr | 52 | 75 | 73 | 81 |
| | 6 hr | 56 | 79 | 76 | 84 |
| | 7 hr | 60 | 83 | 78 | 86 |
| | 8 hr | 63 | 85 | 80 | 88 |

II. Illustrations of the preparation of the aqueous thermosetting vinyl resin emulsion The emulsifier and water, as indicated in the following Table 3, were charged to a flask and, after purging the interior of the flask with nitrogen, the temperature of the contents was raised to 80°C., following which the Table 1

| Preparation Illustration | | 1 | 2 | 3 | 4 | 5 | 6 |
|---|---|---|---|---|---|---|---|
| | Composition | DAP | DAP/BA | DAP/BA | DAP/BA | DAIP/EA | DATP/EHA |
| | Weight Ratio | 100 | 75/25 | 50/50 | 25/75 | 60/40 | 90/10 |
| | Solids Content (wt %) | 40 | 40 | 40 | 40 | 40 | 40 |
| Monomer | DAP | 400 g | 300 g | 200 g | 100 g | — | — |
| | DAIP | — | — | — | — | 240 g | — |
| | DATP | — | — | — | — | — | 360 g |
| | BA | — | 100 g | 200 g | 300 g | — | — |
| | EA | — | — | — | — | 160 g | — |
| | EHA | — | — | — | — | — | 40 g |
| Emulsifier | POENPES | — | — | — | — | 10 g | — |
| | POENPEP | 20 g | 12 g | 8 g | 6 g | — | — |
| | BPOENPEP | — | — | — | — | — | 18 g |
| Catalyst | APS | 10 g | 2 g | 1 g | 1 g | — | — |
| | KPS | — | — | — | — | 1 g | 5 g |
| Water | Deionized Water | 570 g | 586 g | 591 g | 593 g | 589 g | 577 g |
| Polymerization Temperature (°C) | | 80 | 80 | 70 | 70 | 80 | 80 |
| Polymerization Time (hr) | | 7 | 4 | 5 | 3 | 3 | 5 |
| Rate of Polymerization (wt %) | | 60 | 69 | 73 | 71 | 70 | 65 |

Abbreviations used in Table 1.
DAP    Diallyl phthalate
DAIP   Diallyl isophthalate
DATP  Diallyl terephthalate
BA     Butyl acrylate
EA     Ethyl acrylate
EHA   2-ethylhexyl acrylate
POENPES  Ammonium polyoxyethylenenonylphenyl ether sulfate
POENPEP  Sodium polyoxyethylenenonylphenyl ether phosphate
BPOENPEP Sodium bispolyoxyethylenenonylphenyl ether phosphate
APS    Ammonium persulfate
KPS    Potassium persulfate In the Preparation Illustrations 1 – 4 shown in the above Table 1, the polymerization time was extended to 8 hours, and the samples were collected at the several hours indicated in the following Table 2 and measured for their rates of polymerization. The results obtained are shown in Table 2, below.

catalyst was added. The monomeric mixture shown in Table 3 was then added slowly to this system during a 3-hour period, after which the agitation was continued for a further 2 hours to complete the polymerization reaction. In the meanwhile the polymerization temperature was maintained at 80° ± 2°C.

Table 3

| Preparation Illustration | 7 | 8 | 9 | 10 | 11 | 12 | 13 | 14 | 15 | 16 |
|---|---|---|---|---|---|---|---|---|---|---|
| Composition | MMA/EA/GMA | MMA/BA/MAM | VAc/EA/MAA | St/BA/AM | EA/AN/AA/HEMA | MMA/EA | MMA/BA | VAc/EA | St/BA | EA/AN |
| Weight Ratio | 50/47/3 | 70/27/3 | 50/45/5 | 50/40/10 | 90/4/3/3 | 50/50 | 70/50 | 50/50 | 50/50 | 90/10 |
| Solids Content (wt %) | 50 | 50 | 50 | 50 | 50 | 50 | 50 | 50 | 50 | 50 |
| MMA | 250 g | 350 g | | | | 250 g | 350 g | | | |

Table 3-continued

| Preparation Illustration | | 7 | 8 | 9 | 10 | 11 | 12 | 13 | 14 | 15 | 16 |
|---|---|---|---|---|---|---|---|---|---|---|---|
| Monomer | GMA | 15 g | | | | 15 g | | | | | |
| | HEMA | | | | | | | | | | |
| | MAA | | | 25 g | | | | | | | |
| | EA | 235 g | | 225 g | | 450 g | 250 g | | 250 g | | 450 g |
| | BA | | 135 g | | 200 g | | | 150 g | | 250 g | |
| | AA | | | | | 15 g | | | | | |
| | VAc | | | 250 g | | | | | 250 g | | |
| | St | | | | 250 g | | | | | 250 g | |
| | AN | | | | | 20 g | | | | | 50 g |
| | MAM | | 15 g | | | | | | | | |
| | AM | | | | 50 g | | | | | | |
| Emulsifier | SLS | 4 g | 4 g | 2 g | | | 10 g | 4 g | 2 g | | |
| | SDBS | | | | 10 g | | | | | 10 g | |
| | SDSS | | | | | 8 g | | | | | 8 g |
| | POELE | 4 g | | | | 5 g | | | | | 5 g |
| | POENPE | | 4 g | 4 g | 8 g | 5 g | 3 g | 4 g | 4 g | 8 g | 5 g |
| | POPPOEE | | | 4 g | | | | | 4 g | | |
| Catalyst | KPS | 2 g | 2 g | 2 g | 2 g | 2 g | 2 g | 2 g | 2 g | 2 g | 2 g |
| Water | Deionized Water | 490 g | 490 g | 488 g | 480 g | 480 g | 480 g | 490 g | 488 g | 480 g | 480 g |

Abbreviations used in Table 3:

| | |
|---|---|
| MMA | Methyl methacrylate |
| GMA | Glycidyl methacrylate |
| HEMA | 2-hydroxyethyl methyacrylate |
| MAA | Methacrylic acid |
| EA | Ethyl acrylate |
| BA | Butyl acrylate |
| AA | Acrylic acid |
| VAc | Vinyl acetate |
| St | Styrene |
| AN | Acrylonitrile |
| MAM | N-methylolacrylamide |
| AM | Acrylamide |
| SLS | Sodium laurylsulfate |
| SDBS | Sodium dodecylbenzenesulfonate |
| SDSS | Sodium dioctylsulfosuccinate |
| POELE | Polyoxyethylenelauryl ether |
| POENPE | Polyoxyethylenenonylphenyl ether |
| POPPOEE | Polyoxypropylenepolyoxyethylene ether |
| KPS | Potassium persulfate |

EXAMPLE 1 AND CONTROL

Forty grams of the aqueous thermosetting vinyl resin (TSV resin) emulsion obtained in the Preparation Illustration 7 of the foregoing Table 3 and 10 grams of the aqueous DAP resin emulsion of the several rates of polymerization shown in Table 4, below, obtained in the Preparation Illustrations 1 – 4 of the foregoing Table 2, were blended together to obtain the diallyl phthalate resin-containing aqueous emulsions (DAP resin content 16.7 weight %, TSV resin content 83.3 weight %).

The resulting emulsions were tested for their film-forming property and thermal resistance by the methods described below and evaluated, with the results shown in Table 4, below. In this table there are shown together as controls the results obtained when similar tests were conducted by using the aqueous DAP resin emulsion independently. Further, in the table, the emulsions prepared from the aqueous thermosetting vinyl resin emulsion and the aqueous DAP resin emulsions whose rates of polymerization are without the range of 30 – 75 weight % are also presented as controls.

Test Method and Evaluation

1. Film-forming test

Each sample was diluted with an equal amount of water and then spread out over the whole surface of a clean slide and dried for 10 minutes at 40°C., thus preparing a uniform coating having a thickness of about 0.2 mm. The so obtained dried product was then examined with the naked eye to determine whether it was a uniform continuous coating and also whether it was clouded. The results were then evaluated and rated as follows:

⊚ — Those in which a uniform continuous coating was formed and moreover which were not clouded.

0 — Those in which a uniform continuous coating was formed, but which were clouded slightly.

Δ — Those in which a uniform continuous coating was formed, but which were extremely clouded.

X — Those in which a uniform continuous coating could not be formed.

2. Thermal resistance test

A fine quality paper of an areal weight of 70 g/m² was coated with the sample in an amount of 10 g/m², using a wire rod, after which the coating was air-dried for 2 minutes at 140°C. The coated surfaces of the paper were then put together and hot-pressed under the conditions of a pressure of 1 kg/cm², a temperature of 150°C. and a sealing time of 5 seconds, using a heat-sealing tester. The results of the test were evaluated and rated as follows:

⊚ — Those in which no blocking occurred at all.

0 — Those in which slight blocking occurred in parts of the sealed surface of the papers.

Δ — Those in which extreme blocking occurred in parts of the sealed surfaces of the papers.

X — Those in which there was complete blocking of the sealed surfaces of the papers.

Table 4

| | | Emulsion | | |
|---|---|---|---|---|
| | | DAP Resin Singly | | TSV Resin + DAP Resin |
| | | Sample | | |
| Rate of polymerization | | Film-forming property | Thermal resistance | Film-forming property | Thermal resistance |
|---|---|---|---|---|---|
| Sample of Preparation Illustration 1 | 17 wt % | O | X | ◎ | X |
| | 25 wt % | Δ | Δ | ◎ | X |
| | 40 wt % | X | O | ◎ | ◎ |
| | 56 wt % | X | O | ◎ | ◎ |
| Sample of Preparation Illustration 2 | 23 wt % | O | X | ◎ | X |
| | 35 wt % | Δ | X | ◎ | O |
| | 60 wt % | X | O | ◎ | ◎ |
| | 69 wt % | X | O | ◎ | ◎ |
| | 79 wt % | X | O | X | O |
| Sample of Preparation Illustration 3 | 23 wt % | O | X | ◎ | X |
| | 43 wt % | O | Δ | ◎ | ◎ |
| | 63 wt % | X | O | ◎ | ◎ |
| | 69 wt % | X | O | ◎ | ◎ |
| | 80 wt % | X | O | Δ | O |

EXAMPLE 2 AND CONTROLS

The aqueous DAP resin emulsion of the Preparation Illustration 2 of Table 1 and the aqueous TSV resin emulsion of the Preparation Illustration 8 of Table 3 were blended together such that the proportion of the former to the latter was 16.6 weight % to 83.4 weight % to prepare the diallyl phthalate resin-containing aqueous emulsion (Example 2).

On the other hand, a monomeric mixture consisting of 60 grams of DAP, 128 grams of BA, 280 grams of MMA and 12 grams of MAM; an emulsifier consisting of 2.4 grams of POENPEP, 3.2 grams of POENPE and 3.2 grams of SLS; and a catalyst system consisting of 0.4 gram of APS and 1.6 grams of KPS; and 507.6 grams of water were used and by operating as in the case of the illustrations of the preparation of the aqueous TSV resin emulsions of Table 3, an aqueous copolymer resin emulsion derived from the same monomers as those forming the hereinbefore described DAP resin and TSV resin components was prepared by emulsion polymerization (Control A).

Further, as controls, diallyl phthalate resin-containing aqueous emulsions were prepared using the same aqueous DAP resin emulsion as that of Example 2 blended with the aqueous methyl methacrylate-butyl acrylate resin emulsion, aqueous methyl methacrylate-butyl acrylate resin emulsion, aqueous vinyl acetate-ethyl acrylate resin emulsion, aqueous styrene-butyl acrylate resin emulsion and aqueous ethyl acrylate-acrylonitrile resin emulsion of the Preparation Illustrations 12 – 16 of Table 3, and the commercially available aqueous ethylene-vinyl acetate resin emulsion, aqueous vinyl chloride resin emulsion and styrene-butadiene latex, in amounts such that the DAP resin content in weight % would be the same as hereinbefore indicated (Controls B, C, D, E, F, G, H and I).

The aqueous resin emulsions obtained in Example 2 and Controls A-I were tested for their film-forming properties and thermal resistance as in Example 1 with the results shown in Table 5, below.

Table 5

| Aqueous Emulsion | Monomer | Composition | Solids Content wt % | Example 2 | Controls A | B | C | D | E | F | G | H | I |
|---|---|---|---|---|---|---|---|---|---|---|---|---|---|
| Diallyl phthalate resin | DAP/BA | 75/25 | 40 | 20g | | 20g | 20g | 20g | 20g | 20g | 20g | 20g | 20g |
| Thermosetting vinyl resin | MMA/BA/MAM | 70/27/3 | 50 | 80g | | | | | | | | | |
| DAP-TSV copolymer resin | DAP/BA/MMA/MAM | 15/26.6/56/2.4 | 48 | | 100g | | | | | | | | |
| Vinyl copolymer resin | MMA/EA | 50/50 | 50 | | | 80g | | | | | | | |
| " | MMA/BA | 70/30 | 50 | | | | 80g | | | | | | |
| " | VAc/EA | 50/50 | 50 | | | | | 80g | | | | | |
| " | St/BA | 50/50 | 50 | | | | | | 80g | | | | |
| " | EA/AN | 90/10 | 50 | | | | | | | 80g | | | |
| " | Et/VAc * | | 55 | | | | | | | | 73g | | |
| " | PVC ** | | 45 | | | | | | | | | 89g | |
| " | St/Bu *** | | 49 | | | | | | | | | | 82g |
| Film Forming Property test | | | | ◎ | X | ◎ | ◎ | ◎ | ◎ | ◎ | ◎ | ◎ | ◎ |
| Thermal Resistance Test | | | | ◎ | O | X | X | X | X | X | X | O | X |

Notes:
* Ethylene-vinyl acetate — SUMIKAFLEX 100HS produced by Sumitomo Chemical Company, Japan
** Vinyl chloride — VINIBRAN 200C produced by Nisshin Chemical Company, Japan
*** Styrene-butadiene — NIPOL LX407 produced by Nihon Zeon Company, Japan

EXAMPLE 3 AND CONTROLS

The aqueous DAP resin emulsions obtained in the Preparation Illustrations 1 – 3, 5 and 6 of Table 1 and the aqueous TSV resin emulsions obtained in the Preparation Illustrations 7 – 11 of Table 3 were blended in the proportions indicated in the following Table 6 to obtain the DAP resin-containing aqueous emulsions. Coatings obtained from these emulsions were tested for their thermal resistance, luster and adhesiveness with the results shown in table 6, below. In the table are also shown, by way of comparison, controls which do not satisfy the requisites of claim 1. The foregoing properties were tested in the following manner.

1. Thermal resistance. A fine quality paper of an areal weight of 70 g/m² was coated severally with each of the sample emulsions in an amount of 10 g/m², using a wire rod, after which the coated paper was air-dried for 2 minutes at 140°C. The coated surfaces of the paper were put together and hot-pressed under the conditions of a pressure of 1 kg/cm² and sealing time of 5 seconds, using a heat-sealing tester. The critical temperature at which blocking took place was determined in this case, and the results were then evaluated and rated as follows:

o — Those in which blocking took place at above 160°C.
0 — Those in which blocking took place at 110° to below 160°C.
Δ — Those in which blocking took place at 60° to below 110°C.
X — Those in which blocking took place at less than 60°C.

2. Luster. TiO₂ (R) was admixed uniformly with each of the sample emulsion to yield a pigment concentration of 15% by volume, after which the samples were coated and dried as in the foregoing thermal resistance test. The coated papers were then measured for their 60° specular reflectance, and the results were then evaluated and rated as follows:

◎ — Those of above 92%.
0 — Those from 80% to below 92%.
Δ — Those from 60% to below 80°C.
X — Those less than 60%.

3. Adhesiveness. A nylon sheet and a polyvinyl chloride sheet were adhered to each other with each of the sample emulsion and dried by heating for 30 minutes at 100°C. This was followed by conducting the 90-degree peeling test on 30-mm-wide test pieces. The adhesiveness was indicated as follows:

$$\text{Adhesiveness (kg/30 mm)} = \frac{\text{Force required to break adhesion (kg)}}{\text{Width of the adhered test pieces (mm)}}$$

◎ — Those of above 6 kg/30 mm.
0 — Those from 4 to below 6 kg/cm mm.
Δ — Those from 2 to below 4 kg/30 mm.
X — Those less than 2 kg/30 mm.

Table 6

| | Monomer | (Polymerization rate) | (Composition) | | Example 3 | | | | | | | | | | | | | | |
|---|---|---|---|---|---|---|---|---|---|---|---|---|---|---|---|---|---|---|---|
| | | | | | 1 | 2 | 3 | 4 | 5 | 6 | 7 | 8 | 9 | 10 | 11 | 12 | 13 | 14 | 15 |
| DAP resin | DAP | (56 wt%) | 100 | (g) | 10 | | | | | | | | | | 20 | | | | |
| | DAP/BA | (69 wt%) | 75/25 | (g) | | 10 | | | | 15 | 15 | 15 | 15 | 15 | | 20 | | | |
| | DAP/BA | (73 wt%) | 50/50 | (g) | | | 10 | | | | | | | | | | 20 | | |
| | DAP/BA | (71 wt%) | 25/75 | (g) | | | | | | | | | | | | | | | |
| | DAIP/EA | (70 wt%) | 60/40 | (g) | | | | 10 | | | | | | | | | | 20 | |
| | DATP/EHA | (65 wt%) | 90/10 | (g) | | | | | 10 | | | | | | | | | | 20 |
| TSV resin | MMA/EA/GMA | | 50/47/3 | (g) | 40 | 40 | 40 | 40 | 40 | 35 | | | | | | | | | |
| | MMA/BA/MAM | | 70/27/3 | (g) | | | | | | | 35 | | | | 30 | 30 | 30 | 30 | 30 |
| | VAc/EA/MAA | | 50/45/5 | (g) | | | | | | | | 35 | | | | | | | |
| | St/BA/AM | | 50/40/10 | (g) | | | | | | | | | 35 | | | | | | |
| | EA/AN/AA/HEMA | | 90/4/3/3 | (g) | | | | | | | | | | 35 | | | | | |
| DAP resin content in product emulsion (wt %) | | | | | 16.6 | 16.6 | 16.6 | 16.6 | 16.6 | 25 | 25 | 25 | 25 | 25 | 35 | 35 | 35 | 35 | 35 |
| TSV resin content in product emulsion (wt %) | | | | | 83.4 | 83.4 | 83.4 | 83.4 | 83.4 | 75 | 75 | 75 | 75 | 75 | 65 | 65 | 65 | 65 | 65 |
| Thermal resistance | | | | | ◎ | ◎ | ◎ | ◎ | ◎ | ◎ | ◎ | ◎ | ◎ | ◎ | ◎ | ◎ | ◎ | ◎ | ◎ |
| Luster | | | | | ◎ | ◎ | ◎ | ◎ | ◎ | ◎ | ◎ | ◎ | ◎ | ◎ | ◎ | ◎ | ◎ | ◎ | ◎ |
| Adhesiveness | | | | | ◎ | ◎ | ◎ | ◎ | ◎ | ◎ | ◎ | ◎ | ◎ | ◎ | ◎ | ◎ | ◎ | ◎ | ◎ |

| | Monomer | (Polymerization rate) | (Composition) | | Controls | | | | | | | | | |
|---|---|---|---|---|---|---|---|---|---|---|---|---|---|---|
| | | | | | 1 | 2 | 3 | 4 | 5 | 6 | 7 | 8 | 9 | 10 |
| DAP resin | DAP | (56 wt%) | 100 | (g) | | | | | | | | | | |
| | DAP/BA | (69 wt%) | 75/25 | (g) | | | | | | | | | | |
| | DAP/BA | (73 wt%) | 50/50 | (g) | | | | | | | | | | |
| | DAP/BA | (71 wt%) | 25/75 | (g) | 10 | 20 | 30 | 40 | 50 | | | | | |
| | DAIP/EA | (70 wt%) | 60/40 | (g) | | | | | | | | | | |
| | DATP/EHA | (65 wt%) | 90/10 | (g) | | | | | | | | | | |
| TSV resin | MMA/EA/GMA | | 50/47/3 | (g) | 40 | | | | | 50 | | | | |
| | MMA/BA/MAM | | 70/27/3 | (g) | | 30 | 20 | 10 | | | | | | |
| | VAc/EA/MAA | | 50/45/5 | (g) | | | | | | | 50 | | | |
| | St/BA/AM | | 50/40/10 | (g) | | | | | | | | 50 | 50 | |
| | EA/AN/AA/HEMA | | 90/4/3/3 | (g) | | | | | | | | | | 50 |
| DAP resin content in product emulsion (wt %) | | | | | 16.6 | 35 | 55 | 76 | 100 | 0 | 0 | 0 | 0 | 0 |
| TSV resin content in product emulsion (wt %) | | | | | 83.4 | 65 | 45 | 24 | 0 | 100 | 100 | 100 | 100 | 100 |
| Thermal resistance | | | | | Δ | Δ | 0 | Δ | —* | X | X | X | X | X |
| Luster | | | | | Δ | Δ | Δ | Δ | — | Δ | Δ | Δ | Δ | Δ |
| Adhesiveness | | | | | Δ | Δ | Δ | Δ | — | Δ | Δ | Δ | Δ | Δ |

*A continuous coating could not be obtained, and hence measurement could not be made.

EXAMPLE 4 (RUNS 1 – 15)

Preparation of Impregnated Paper and Decorative Plywood

Compositions consisting of each of the samples of aqueous DAP resin emulsions of the Preparation Illustrations 1 – 6, each of the samples of aqueous TSV resin emulsions of the Preparation Illustrations 7 – 11, crosslinking agents cross-linking catalysts were prepared as indicated in Table 2.

A wood-grain-pattern printed paper (30 × 30 cm) of an areal weight of 80 g/m² was dipped in the above compositions, after which the impregnated papers were air-dried at 50°C. and precured for 5 minutes at 65°C. to prepare impregnated papers with a pickup of about 100%.

Each of these impregnated papers was then laid atop 3-mm-thick plywood and pressed for 10 minutes at 15 kg/cm² and 140°C. with a flat press dependingly provided with a mat surface embossed with a wood grain design, to prepare a decorative plywood.

The so prepared decorative plywoods were then tested in accordance with the method for testing specially processed decorative plywoods of the Japanese Agricultural Standards (JAS). The results obtained are shown in Table 7.

Control

As controls, impregnated papers and decorative plywoods were prepared as in Example 4, using compositions consisting of the DAP resin emulsions or TSV resin or vinyl resin emulsions, cross-linking agent and catalyst. The so prepared decorative plywoods were then tested, and the results obtained are also shown in Table 7.

Test method and evaluation

1. Immersion peeling test. A 75 × 75 mm test piece was immersed for 2 hours in either boiling water, 60°C. water or 35°C. water and dried for 3 hours at 60°C. The portion not peeling must account for at least 50 mm of the test piece. The results were then evaluated and rated as follows:
⊚ — Those passing the test with boiling water.
0 — Those failing the boiling water test but passing the test with 60°C. water
Δ — Those failing the 60°C. water test but passing the test with 35°C. water.
X — Those failing the test with 35°C. water.

2. Hot-cold repeating test. A 150 × 150 mm test piece was left of stand for 2 hours at either 80°C., 60°C. or 40°C. followed by standing for 2 hours at −20°C. This procedure was repeated twice. There must be no cracks, swells, wrinkles, discolorations or shrinkage in the test piece. The results were evaluated and the following ratings were assigned.
⊚ — Those in which no changes took place at 80°C.
0 — Those in which changes took place at 80°C. but not at 60°C.
Δ — Those in which changes took place at 60°C. but not at 40°C.
X — Those in which changes took place at 40°C.

3. Water resistance test. Two test pieces 150 × 150 mm in size were adhered with a room temperature phenolic resin adhesive with the rear sides of the test pieces facing each other, after which the edge portion was covered. The so prepared assembly was then immersed for one hour in either hot water of 80°C., 60°C. or 40°C. followed by drying for 2 hours at 60°C. There must be no cracks, swells, peeling, or discoloration nor a change in the luster of the decorative surface of the test pieces. The test pieces were examined, and the results were evaluated and rated as follows:

⊚ — Those in which no changes took place on immersion in 80°C. hot water
0 — Those in which changes took place on immersion in 80°C. hot water but not in 60°C. hot water.
Δ — Those in which changes took place on immersion in 60°C. hot water but not in 40°C. hot water.
X — Those in which changes took place on immersion in 40°C. hot water.

4. Attrition test. Three test pieces (decorative laminate sheets) were prepared, each of which was of an annular shape consisting of a disc with a diameter of 120 mm in which a hole with a diameter of 10 mm was provided at its center. These test pieces were fixed horizontally on a stationary stand of a testing machine with the decorative surface of each test piece facing upwards. The annular portion of the test piece was rubbed with a rotating rubbing member with a load of 500 g until the surface of the base of the decorative paper on the test piece was exposed to the surface (the end point of rubbing). The number of turns through which the rubbing member rotated until that time was read, and the attrition value and the amount of attrition were calculated as follows:

$$\text{Attrition value} = \frac{\text{Sum of the number of rotations of each test piece}}{3}$$

$$\text{Amount of attrition (G)} = \frac{W}{C} \times 100$$

where W is the average value of the reduction in weight of the three test pieces that occurred until the end point of rubbing, and C is the attrition value.

The results obtained were evaluated and the following ratings were assigned.
⊚ — Those whose attrition value was above 100, and the amount of attrition 0.1 gram.
0 — Those whose attrition value was above 50 but below 100, and the amount of attrition was less than 0.1 gram.
Δ — Those whose attrition value was above 25 but below 50, and the amount of attrition was less than 0.1 gram.
X — Those whose attrition value was less than 25, and the amount of attrition was less than 0.1 gram.

5. Scratch test. A 90 × 170 mm test piece was used, and three scratches each 50 mm in length were made therein with a diamond needle under a load of 200 grams, 100 grams or 50 grams. The depth of the scratches must average not more than 10 microns. The results of the test were evaluated and the following ratings were assigned.
⊚ — Those in which the depth of the scratches was less than 10 microns under a load of 200 grams.
0 — Those in which the depth of the scratches was 10 microns or more under a load of 200 grams but less than 10 microns at a load of 100 grams.
Δ — Those in which the depth of the scratches was 10 microns or more under a load of 100 grams but less than 10 microns at a load of 50 grams.
X — Those in which the depth of the scratches was 10 microns or more under a load of 50 grams.

6. Impact test. A falling weight of either 150 grams, 100 grams or 50 grams having a distal portion of a curvature radius of 25.4 mm was dropped 50 times from a height of 30 mm onto a test piece 100 mm × 100 mm in size. There must be no changes such as cracks or peeling of the decorative surface. The results of the test were evaluated with the assignment of the following ratings.

◎ — Those in which no changes took place with the 150-gram weight.
0 — Those in which changes took place with the 150-gram weight but no changes took place with the 100-gram weight.
Δ — Those in which changes took place with the 100-gram weight but no changes took place with the 50-gram weight.
X — Those in which changes took place with the 50-gram weight.

EXAMPLE 5 (RUNS 1 – 8)
Preparation of Moldings

Compositions consisting of the DAP resin emulsion (Preparation Illustration 1), the TSV resin emulsion (Preparation Illustration 7), cross-linking agents, fillers, mold releasing agents and catalysts were blended together as indicated in Table 8.

These compositions were dried, roll-kneaded (80°–90°C., 5 minutes) and thereafter pressed to prepare moldings under the conditions of 150°C. temperature and a pressure of 100 kg/cm$^2$.

The so obtained moldings were submitted to tests for determining their resistance to boiling, resistance to acetone and thermal resistance with the results shown in Table 8. The tests were carried out in accordance Table 7

| Monomer | (Polymerization rate) | (Composition) | \multicolumn{15}{c}{Examples} |
|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 |
| DAP resin | | | | | | | | | | | | | | | | | |
| 1 DAP | (56 wt%) | 100 (g) | 500 | | | | | | | | | | 300 | | | | 400 |
| 2 DAP/BA | (69 wt%) | 75/25 (g) | | 500 | | | | 600 | 600 | 600 | 600 | 600 | | | | | |
| 3 DAP/BA | (73 wt%) | 50/50 (g) | | | 500 | | | | | | | | | | 200 | | |
| 4 DAP/BA | (71 wt%) | 25/75 (g) | | | | | | | | | | | 300 | | | 200 | |
| 5 DAIP/EA | (70 wt%) | 60/40 (g) | | | | | 500 | | | | | | | 600 | | | 200 |
| 6 DATP/EHA | (65 wt%) | 90/10 (g) | | | | 500 | | | | | | | | | 400 | 400 | |
| TSV resin | | | | | | | | | | | | | | | | | |
| 7 MMA/EA/GMA | | 50/47/3 (g) | 400 | 400 | 400 | 400 | 400 | 300 | | | | | | 150 | | | |
| 8 MMA/BA/MAM | | 70/27/3 (g) | | | | | | | 300 | | | | 300 | 150 | | | 200 |
| 9 VAc/EA/MAA | | 50/45/5 (g) | | | | | | | | 300 | | | | | 150 | | 100 |
| 10 St/BA/AM | | 50/40/10 (g) | | | | | | | | | 300 | | | | 150 | 100 | |
| 11 EA/AN/AA/HEMA | | 90/4/3/3 (g) | | | | | | | | | | 300 | | | | 200 | |
| 12 MMA/EA | | 50/50 (g) | | | | | | | | | | | | | | | |
| DAP resin content in product emulsion (wt%) | | | 50 | 50 | 50 | 50 | 50 | 61.5 | 61.5 | 61.5 | 61.5 | 61.5 | 61.5 | 61.5 | 61.5 | 61.5 | 61.5 |
| TSV resin content in product emulsion (wt%) | | | 50 | 50 | 50 | 50 | 50 | 38.5 | 38.5 | 38.5 | 38.5 | 38.5 | 38.5 | 38.5 | 38.5 | 38.5 | 38.5 |
| Epoxy resin emulsion (50%)* (g) | | | | | | | | | 100 | 100 | 100 | 100 | | | 50 | 50 | 50 |
| Aqueous melamine resin solution (50%)** (g) | | | 100 | 100 | 100 | 100 | 100 | 100 | | | | | 100 | 100 | 50 | 50 | 50 |
| Benzoyl peroxide | | | | | | | | 5 | 5 | 5 | 5 | 5 | 10 | 10 | 10 | 10 | 10 |
| t-butylperoxibenzoate | | | 10 | 10 | 10 | 10 | 10 | 5 | 5 | 5 | 5 | 5 | | | | | |
| 1. Immersion peeling test | | | ◎ | ◎ | ◎ | ◎ | ◎ | ◎ | ◎ | ◎ | ◎ | ◎ | ◎ | ◎ | ◎ | ◎ | ◎ |
| 2. Hot-cold repeating test | | | ◎ | ◎ | ◎ | ◎ | ◎ | ◎ | ◎ | ◎ | ◎ | ◎ | ◎ | ◎ | ◎ | ◎ | ◎ |
| 3. Water resistance test | | | ◎ | ◎ | ◎ | ◎ | ◎ | ◎ | ◎ | ◎ | ◎ | ◎ | ◎ | ◎ | ◎ | ◎ | ◎ |
| 4. Attrition test | | | ◎ | ◎ | ◎ | ◎ | ◎ | ◎ | ◎ | ◎ | ◎ | ◎ | ◎ | ◎ | ◎ | ◎ | ◎ |
| 5. Scratch test | | | 0 | 0 | 0 | 0 | 0 | 0 | 0 | 0 | 0 | 0 | 0 | 0 | 0 | 0 | 0 |
| 6. Impact test | | | ◎ | ◎ | ◎ | ◎ | ◎ | ◎ | ◎ | ◎ | ◎ | ◎ | ◎ | ◎ | ◎ | ◎ | ◎ |

| | \multicolumn{12}{c}{Controls} |
|---|---|---|---|---|---|---|---|---|---|---|---|---|
| | 1 | 2 | 3 | 4 | 5 | 6 | 7 | 8 | 9 | 10 | 11 | 12 |
| 1 DAP | 900 | | | | | | | | | | | |
| 2 DAP/BA | | 900 | | | | | | | | | | |
| 3 DAP/BA | | | 900 | | | | | | | | | |
| 4 DAP/BA | | | | 900 | | | | | | | | |
| 5 DAIP/EA | | | | | 900 | | | | | | | |
| 6 DATP/EHA | | | | | | 900 | | | | | | |
| 7 MMA/EA/GMA | | | | | | | 900 | | | | | |
| 8 MMA/BA/MAM | | | | | | | | 900 | | | | |
| 9 VAc/EA/MAA | | | | | | | | | 900 | | | |
| 10 St/BA/AM | | | | | | | | | | 900 | | |
| 11 EA/AN/AA/HEMA | | | | | | | | | | | 900 | |
| 12 MMA/EA | | | | | | | | | | | | 900 |
| DAP resin content | 100 | 100 | 100 | 100 | 100 | 100 | 0 | 0 | 0 | 0 | 0 | |
| TSV resin content | 0 | 0 | 0 | 0 | 0 | 0 | 100 | 100 | 100 | 100 | 100 | |
| Epoxy resin emulsion | 100 | 100 | 100 | | | | 100 | 100 | 100 | | | |
| Aqueous melamine | | | | 100 | 100 | 100 | | | | 100 | 100 | 100 |
| Benzoyl peroxide | | | | 10 | 10 | 10 | 5 | 5 | 5 | 5 | 5 | 5 |
| t-butylperoxibenzoate | 10 | 10 | 10 | | | | 5 | 5 | 5 | 5 | 5 | 5 |
| 1. Immersion peeling test | X | X | Δ | Δ | Δ | X | Δ | Δ | Δ | Δ | Δ | Δ |
| 2. Hot-cold repeating test | X | X | Δ | Δ | Δ | X | Δ | Δ | Δ | Δ | Δ | Δ |
| 3. Water resistance test | X | X | Δ | Δ | Δ | X | Δ | Δ | Δ | Δ | Δ | Δ |
| 4. Attrition test | X | X | X | X | X | X | X | X | X | X | X | X |
| 5. Scratch test | X | X | X | X | X | X | X | X | X | X | X | X |
| 6. Impact test | X | X | Δ | Δ | Δ | X | Δ | Δ | Δ | Δ | Δ | Δ |

Notes:
*EPOXY EM-2860 produced by Sanyo Chemical Co., Japan
**NIC ARESIN S-260 produced by Nippon Carbide Industry Co., Japan with the general method for testing thermosetting plastics (JIS Method K 6911).

Control

As controls, moldings were prepared as in Example 5, using compositions of either the DAP resin emulsion or the TSV resin emulsion singly with the cross-linking agents, fillers, mold releasing agents and catalysts. The so obtained moldings were tested in such manner as in Example 5, and the results obtained are also shown in Table 8.

swells. The results of the test were evaluated and assigned the following ratings.
◎ — Those not exhibiting any change at above 180°C.
0 — Those exhibiting a change at above 180°C. but not at 150°C. to below 180°C.
Δ — Those exhibiting a change at 150°C. to below 180°C, but not at less than 150°C.
X — Those exhibiting a change at below 150°C.

Table 8

|  | Example 5 |  |  |  |  |  |  |  | Controls |  |  |  |  |  |
|---|---|---|---|---|---|---|---|---|---|---|---|---|---|---|
|  | 1 | 2 | 3 | 4 | 5 | 6 | 7 | 8 | 1 | 2 | 3 | 4 | 5 | 6 |
| Composition of molding material |  |  |  |  |  |  |  |  |  |  |  |  |  |  |
| DAP resin emulsion |  |  |  |  |  |  |  |  |  |  |  |  |  |  |
| DAP (56 wt% 100) (g) | 250 | 250 | 250 | 250 | 200 | 200 | 200 | 200 | 350 |  | 350 |  | 350 |  |
| TSV resin emulsion |  |  |  |  |  |  |  |  |  |  |  |  |  |  |
| MMA-EA-GMA (50/47/3) (g) | 100 | 100 | 100 | 100 | 150 | 150 | 150 | 150 |  | 350 |  | 350 |  | 350 |
| DAP resin content in product emulsion (wt%) | 66.6 | 66.6 | 66.6 | 66.6 | 51.6 | 51.6 | 51.6 | 51.6 | 100 | 0 | 100 | 0 | 100 | 0 |
| TSV resin content in product emulsion (wt%) | 33.4 | 33.4 | 33.4 | 33.4 | 48.4 | 48.4 | 48.4 | 48.4 | 0 | 100 | 0 | 100 | 0 | 100 |
| Cross-linking agent |  |  |  |  |  |  |  |  |  |  |  |  |  |  |
| 50% unsaturated polyester emulsion ①(g) |  |  | 25 |  |  |  | 25 |  |  |  |  |  | 25 | 25 |
| 50% epoxy resin emulsion ②(g) |  | 50 | 25 | 25 |  | 50 | 25 | 25 |  |  | 50 | 50 | 25 | 25 |
| Aqueous 50% melamine resin solution ③(g) | 50 |  |  | 25 | 50 |  |  | 25 | 50 | 50 |  |  |  |  |
| Filler |  |  |  |  |  |  |  |  |  |  |  |  |  |  |
| Pulp powder | 50 | 50 | 50 | 50 | 50 | 50 | 50 | 50 | 50 | 50 | 50 | 50 | 50 | 50 |
| Precipitated calcium carbonate | 50 | 50 | 50 | 50 | 50 | 50 | 50 | 50 | 50 | 50 | 50 | 50 | 50 | 50 |
| Mold releasing agent |  |  |  |  |  |  |  |  |  |  |  |  |  |  |
| Calcium stearate | 2 | 2 | 2 | 2 | 2 | 2 | 2 | 2 | 2 | 2 | 2 | 2 | 2 | 2 |
| Catalyst |  |  |  |  |  |  |  |  |  |  |  |  |  |  |
| t-butylperbenzoate | 2 | 2 | 2 | 2 | 2 | 2 | 2 | 2 | 2 | 2 | 2 | 2 | 2 | 2 |
| Molded product |  |  |  |  |  |  |  |  |  |  |  |  |  |  |
| Test items |  |  |  |  |  |  |  |  |  |  |  |  |  |  |
| 1. Resistance to boiling water | ◎ | ◎ | ◎ | ◎ | ◎ | ◎ | ◎ | ◎ | Δ | Δ | Δ | Δ | Δ | Δ |
| 2. Resistance to acetone | ◎ | ◎ | ◎ | ◎ | ◎ | ◎ | ◎ | ◎ | X | Δ | X | Δ | X | Δ |
| 3. Thermal resistance | ◎ | ◎ | ◎ | ◎ | ◎ | ◎ | ◎ | ◎ | X | Δ | X | Δ | X | Δ |

①EPOLAC AD-12 produced by NIPPON SHOKUBAI KAGAKU KOGYO CO., Japan
②EPOXY EM-2860 produced by Sanyo Chemical Company, Japan
③NICARESIN S-260 produced by Nippon Carbide Industry Co., Japan Test Methods and Evaluation 1. Resistance-to-boiling water test. A test piece molded to a diameter of 50 mm and a thickness of 30 mm was placed in a beaker containing boiling distilled water and boiled for 15 minutes. The extent of change in appearance and the discoloraton of the boiled water was examined. The results obtained were evaluated and assigned the following ratings.
◎ — Those exhibiting no change at all.
0 — Those whose change was slight.
Δ — Those in which there was a medium degree of change.
X — Those exhibiting a marked change.

2. Resistance-to-acetone test. A test piece molded to a size of 20 × 20 × 20 mm was placed in a condenser-equipped flask alon with the acetone and boiled for 30 minutes, after which the appearance of the test piece was immediately examined for such marked changes as cracks and swells. The results were evaluated and assigned the following ratings.
◎ — Those exhibiting no change at all.
0 — Those in which the change was slight.
Δ — Those in which the change was of a medium degree.
X — Those exhibiting a marked change.

3. Thermal resistance test. A test piece molded to a size of 50 mm in diameter and 3 mm in thickness was placed in a thermostatic chamber for 2 hours, after which the appearance of the test piece was examined for the presence of such marked changes as cracks and

EXAMPLE 6 (RUNS 1 – 8)

Preparation of a Laminated Sheet

Compositions consisting of the DAP resin emulsion (Preparation Illustration 2), the TSV resin emulsion (Preparation Illustration 8), cross-linking agents and catalysts were prepared as indicated in Table 9 and used as the impregnating liquids.

A glass cloth (SLS – 213A) was impregnated with the foregoing impregnating liquid, after which it was air-dried at 50°C. and then precured for 10 minutes at 90°C. to prepare a prepreg having a resin retention of 40 – 50%.

Five sheets of the so prepared prepregs were stacked and pressed for 30 minutes under the conditions of a temperature of 150°C. and a pressure of 20 kg/cm² to prepare a laminated sheet.

Resistance-to-acetone and thermal resistance tests using the laminated sheets were conducted with the results shown in Table 9. The tests were conducted in accordance with the general test method for thermosetting plastics (JIS Method K 1911).

CONTROLS (RUNS 1 – 6)

Compositions consisting of the either the DAP resin emulsion or the TSV resin emulsion singly, along with the cross-linking agents and catalysts were prepared by operating as in Example 6, following which prepregs were made therefrom, which were, in turn, made into a laminated sheet as in said example. These were tested with the results shown in Table 9.

Test Method and Evaluation

1. Resistance-to-acetone test. A test piece of a suitable dimension and acetone were placed in a condenser-equipped flask and boiled for 30 minutes, after which the appearance of the test piece was examined for the presence of such marked changes as cracks and swells. The results of the test were evaluated and the following ratings were assigned.

◎ — Those exhibiting no changes at all.
0 — Those whose change was slight.
Δ — Those in which an appreciable change was noted.
X — Those exhibiting a marked change.

2. Thermal resistance test. A 50 × 50 mm test piece was placed in a thermostatic chamber for 2 hours. Its appearance was then examined for any marked change such as cracks and swells. The results of the test were then evaluated and the following ratings were assigned.

◎ — Those in which no changes were noted at above 180°C.
0 — Those in which changes were noted at above 180°C. but not at 150°C. to below 180°C.
Δ — Those in which changes were noted at 150°C. to below 180°C., but not at less than 150°C.
X — Those in which changes were noted at less than 150°C.

mer of from 30 to 75 weight percent, said diallyl phthalate resin consisting of
1. diallyl phthalate present in from 50 to 100 weight percent, and
2. an alkyl acrylate present in from 50 to 0 weight percent; and
B. an aqueous emulsion of a thermosetting vinyl resin consisting of a copolymer of
1. a vinyl compound present in from 10 to 1 weight percent and containing a thermosetting functional moiety selected from the group consisting of glycidyl, N-methylol, N-alkoxymethyl, carboxyl, hydroxyl, amino, and amide, and
2. a vinyl compound present in from 90 to 99 weight percent and not containing a thermosetting functional moiety and selected from the group consisting of $C_{1-8}$ alkyl esters of α,β-unsaturated carboxylic acid, vinyl esters, aromatic vinyl compounds, and α,β-unsaturated nitriles, said product containing from 10 to 70 weight percent of the resin of A) and from 90 to 30 weight percent of Table 9

| | Example 6 | | | | | | | | Controls | | | | | |
|---|---|---|---|---|---|---|---|---|---|---|---|---|---|---|
| | 1 | 2 | 3 | 4 | 5 | 6 | 7 | 8 | 1 | 2 | 3 | 4 | 5 | 6 |
| Composition of Molding resin | | | | | | | | | | | | | | |
| DAP resin emulsion | | | | | | | | | | | | | | |
| DAP-BA (69 wt% 75/25) (g) | 500 | 500 | 500 | 500 | 400 | 400 | 400 | 400 | | 800 | | 800 | | 800 |
| TSV resin emulsion | | | | | | | | | | | | | | |
| MMA-BA-MAM (70/27/3) (g) | 300 | 300 | 300 | 300 | 400 | 400 | 400 | 400 | 800 | | 800 | | 800 | |
| DAP resin content in product emulsion (wt %) | 57.1 | 57.1 | 57.1 | 57.1 | 44.4 | 44.4 | 44.4 | 44.4 | 0 | 100 | 0 | 100 | 0 | 100 |
| TSV resin content in product emulsion (wt %) | 42.9 | 42.9 | 42.9 | 42.9 | 55.6 | 55.6 | 55.6 | 55.6 | 100 | 0 | 100 | 0 | 100 | 0 |
| Cross-linking agent | | | | | | | | | | | | | | |
| 50% unsaturated polyester emulsion①(g) | | | 100 | | | | 100 | | | | | | 100 | 100 |
| 50% epoxy resin emulsion②(g) | | 200 | 100 | 100 | | 200 | 100 | 100 | | | 200 | 200 | 100 | 100 |
| Aqueous 50% melamine resin emulsion③(g) | 200 | | | 100 | 200 | | | 100 | 200 | 200 | | | | |
| Laminated sheet | | | | | | | | | | | | | | |
| Catalyst | | | | | | | | | | | | | | |
| t-butylperbenzoate | 10 | 10 | 10 | 10 | 10 | 10 | 10 | 10 | 10 | 10 | 10 | 10 | 10 | 10 |
| Test items | | | | | | | | | | | | | | |
| 1. Resistance to acetone | ◎ | ◎ | ◎ | ◎ | ◎ | ◎ | ◎ | ◎ | X | X | X | X | X | X |
| 2. Thermal resistance | ◎ | ◎ | ◎ | ◎ | ◎ | ◎ | ◎ | ◎ | X | Δ | X | Δ | X | Δ |

①EPOLAC AD-12 produced by NIPPON SHOKUBAI KAGAKU KOGYO CO., Japan
②EPOXY EM-2860 produced by Sanyo Chemical Company, Japan
③NICARESIN S-260 produced by Nippon Carbide Industry Co., Japan

What is claimed is:

1. A diallyl phthalate resin-containing aqueous emulsion product containing:
A. an aqueous emulsion of a diallyl phthalate resin having a degree of conversion of monomer to polythe resin of B), based on the total resin content.

2. The resin emulsion of claim 1 wherein the functional moiety of (B) (1) is glycidyl, N-methylol, or N-alkoxymethyl.

3. The resin emulsion of claim 1 wherein component (A) (2) is a $C_{1-8}$ alkyl ester of acrylic acid.

* * * * *

UNITED STATES PATENT AND TRADEMARK OFFICE
CERTIFICATE OF CORRECTION

PATENT NO. : 3,963,661
DATED : June 15, 1976
INVENTOR(S) : SUZUI, ET AL.

It is certified that error appears in the above-identified patent and that said Letters Patent are hereby corrected as shown below:

Claim 2, line 2, delete "(B)", insert -- B) --

Claim 3, line 2, delete "(A)", insert -- A) --

Signed and Sealed this

Eighteenth Day of October 1977

[SEAL]

Attest:

RUTH C. MASON
Attesting Officer

LUTRELLE F. PARKER
Acting Commissioner of Patents and Trademarks